United States Patent
Kaino et al.

(10) Patent No.: US 9,429,810 B2
(45) Date of Patent: Aug. 30, 2016

(54) ELECTROPHORESIS DEVICE AND DISPLAY

(71) Applicant: Sony Corporation, Tokyo (JP)

(72) Inventors: Yuriko Kaino, Kanagawa (JP); Ken Kobayashi, Kanagawa (JP); Aya Shuto, Kanagawa (JP); Hidehiko Takanashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/922,666

(22) Filed: Jun. 20, 2013

(65) Prior Publication Data

US 2014/0002889 A1   Jan. 2, 2014

(30) Foreign Application Priority Data

Jun. 29, 2012   (JP) .................. 2012-147643

(51) Int. Cl.
*G02B 26/00* (2006.01)
*G09G 3/34* (2006.01)
*G03G 17/04* (2006.01)
*G02F 1/167* (2006.01)

(52) U.S. Cl.
CPC ....... *G02F 1/167* (2013.01); *G02F 2001/1678* (2013.01)

(58) Field of Classification Search
CPC ................ G02F 1/0123; G02F 1/167; G02F 2001/1678; G02F 1/172; G02F 2001/1672; G02F 1/07; G02B 26/026; G02B 26/001
USPC ........ 359/296, 245, 253–254, 290–291, 298; 349/33; 345/49, 105, 107; 430/31–32
See application file for complete search history.

(56) References Cited

U.S. PATENT DOCUMENTS

| | | | | |
|---|---|---|---|---|
| 5,276,438 | A * | 1/1994 | DiSanto | G02F 1/167 340/296 |
| 7,990,602 | B2 * | 8/2011 | Tatsuura | G02F 1/153 345/49 |
| 2001/0041339 | A1 * | 11/2001 | Anderson et al. | 435/6 |
| 2002/0050976 | A1 * | 5/2002 | Yamaguchi et al. | 345/105 |
| 2002/0089735 | A1 * | 7/2002 | Albert et al. | 359/296 |
| 2006/0291033 | A1 | 12/2006 | Yang et al. | |
| 2007/0196401 | A1 * | 8/2007 | Naruse et al. | 424/401 |
| 2008/0036731 | A1 * | 2/2008 | Shigehiro et al. | 345/107 |
| 2008/0112040 | A1 * | 5/2008 | Suwabe | G02F 1/167 359/296 |
| 2011/0310465 | A1 * | 12/2011 | Takanashi et al. | 359/296 |
| 2012/0099182 | A1 * | 4/2012 | Ogawa | G02F 1/167 359/296 |
| 2014/0087296 | A1 * | 3/2014 | Bryning | G02F 1/167 430/32 |

FOREIGN PATENT DOCUMENTS

| | | |
|---|---|---|
| EP | 1 752 820 | 2/2007 |
| EP | 2 397 893 | 12/2011 |
| JP | 2012-022296 A | 2/2012 |

* cited by examiner

*Primary Examiner* — Dawayne A Pinkney
(74) *Attorney, Agent, or Firm* — K&L Gates LLP

(57) ABSTRACT

An electrophoresis device includes: a plurality of electrophoretic particles included in insulating liquid and configured of a first particle and a second particle, in which the first particle and the second particle have respective charging characteristics that are different from each other; and a porous layer included in the insulating liquid and formed of a fibrous structure.

28 Claims, 3 Drawing Sheets

ELECTROPHORESIS DEVICE AND DISPLAY

BACKGROUND

The present disclosure relates to an electrophoresis device including a plurality of electrophoretic particles in insulating liquid, and a display that uses such an electrophoresis device.

In recent years, along with the popularization of a mobile apparatus as represented by a cellular phone, a personal digital assistant, or the like, the demand for a low-power and high-definition image quality display has been increasing. Above all, recently with the advent of an emerging business for delivering electronic books, a personal digital assistant (electronic book terminal) for a reading application with the purpose of reading textual information over an extended time period has drawn attention, and thus a display having the display image quality suited for such an application has been desired.

As a display for a reading application, a choresteric liquid crystal display, an electrophoretic display, an electro-oxidation-reduction display, a twisting ball-type display, or the like have been proposed. Among them, a reflective display that performs a bright display utilizing reflection (scattering) of outside light in the same manner as paper has received a lot of attention. This reflective display has the display image quality almost similar to that of paper, as well as low power consumption because the necessity for a backlight is eliminated. An example of such a reflective display includes an electrophoretic display that generates the contrast utilizing an electrophoretic phenomenon.

For further reducing the power consumption of an electrophoretic display, there is a method to adopt a device configuration that eliminates the necessity for a power while the same image is held on a display panel, that is, has the memory performance. For example, an electrophoretic display described in Japanese Unexamined Patent Application Publication No. 2012-022296 is configured of electrophoretic particles, and a fibrous structure including non-electrophoretic particles having the reflection characteristics different from those of the electrophoretic particles in insulating liquid.

SUMMARY

However, such a display described in Japanese Unexamined Patent Application Publication No. 2012-022296 has the excellent contrast performance, although there is room for satisfactory memory performance.

It is desirable to provide an electrophoresis device capable of improving memory performance, and a display that uses the electrophoresis device.

According to an embodiment of the present disclosure, there is provided an electrophoresis device including: a plurality of electrophoretic particles included in insulating liquid and configured of a first particle and a second particle, in which the first particle and the second particle have respective charging characteristics that are different from each other; and a porous layer included in the insulating liquid and formed of a fibrous structure.

According to an embodiment of the present disclosure, there is provided a display provided with a pair of base materials one or both of which has an optical transparency and each of which is provided with an electrode, and an electrophoresis device disposed between the pair of base materials. The electrophoresis device includes: a plurality of electrophoretic particles included in insulating liquid and configured of a first particle and a second particle, in which the first particle and the second particle have respective charging characteristics that are different from each other; and a porous layer included in the insulating liquid and formed of a fibrous structure.

In the electrophoresis device and the display that uses the electrophoresis device according to the above-described respective embodiments of the present disclosure, the first particle and the second particle having the respective charging characteristics different from each other are used as the electrophoretic particles, thereby making it possible to suppress migration of the electrophoretic particles after removal of an electric field.

In the electrophoresis device and the display that uses the electrophoresis device according to the above-described respective embodiments of the present disclosure, the different kinds of electrophoretic particles having the respective charging characteristics different from each other are used. Thus, diffusion of the electrophoretic particles after the electric field removal is suppressed, and memory performance is improved. Hence, it is possible to provide the display with reduced power consumption.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

DETAILED DESCRIPTION

Hereinafter, some embodiments of the present disclosure are described in details with reference to the drawings. It is to be noted that the descriptions are provided in the order given below.
1. Embodiment
1-1. Overall Configuration
1-2. Method of Preparing Electrophoretic Particles
2. Application Example
3. Working Examples

1. Electrophoresis Device

Figure 1:
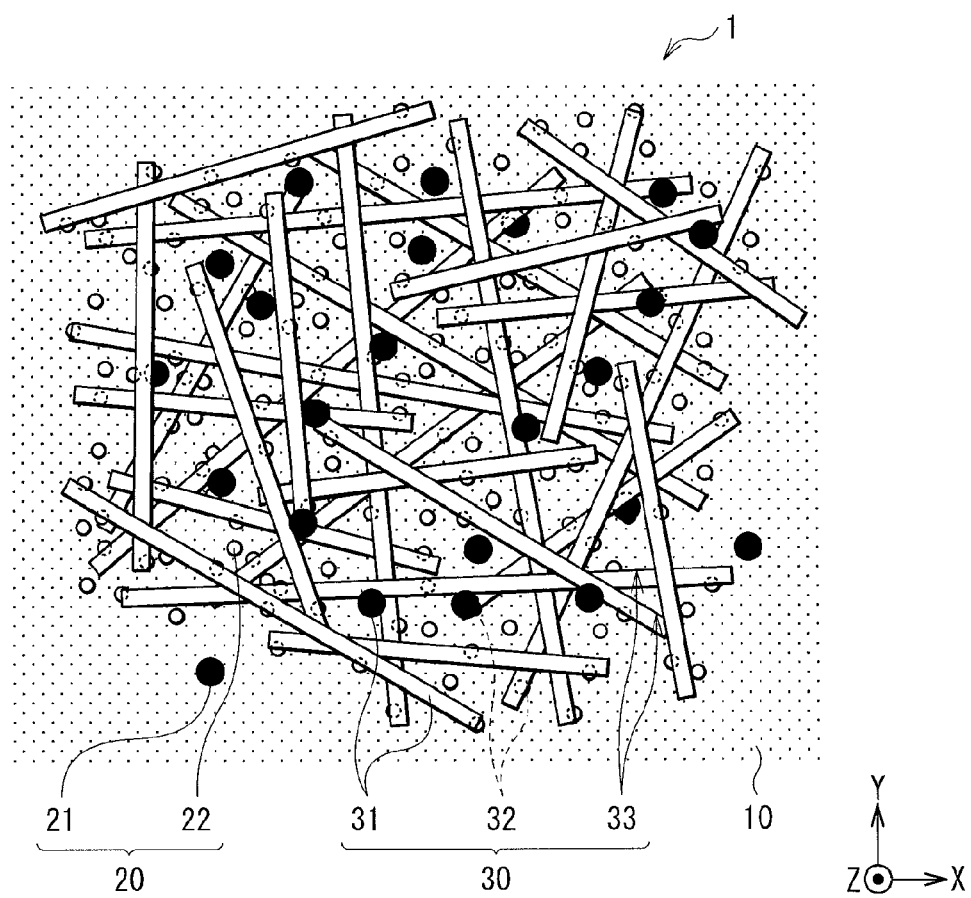
FIG. 1 is a top view showing a configuration of an electrophoresis device according to an embodiment of the present disclosure.
Figure 2:
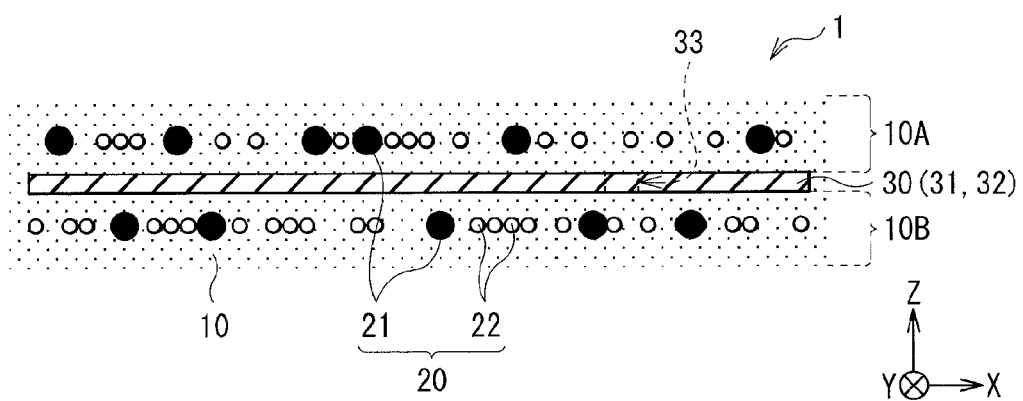
FIG. 2 is a cross-sectional view showing a configuration of the electrophoresis device.

FIG. 1 and FIG. 2 show a planar configuration and a cross-sectional configuration of an electrophoresis device 1 according to an embodiment of the present disclosure, respectively. The electrophoresis device 1, which generates the contrast using an electrophoretic phenomenon, may be applicable to a wide variety of electronic apparatuses, such as a display and the like. This electrophoresis device 1 includes a plurality of electrophoretic particles 20 having polarities and a porous layer 30 in insulating liquid 10. In this embodiment of the present disclosure, the electrophoretic particles 20 are configured of first particles 21 and second particles 22 having charging characteristics different from each other.

1-1. Overall Configuration

[Insulating Liquid]

The insulating liquid 10 may be, for example, one kind of, or two or more kinds of organic solvent, and more specifically an organic material, such as paraffin or isoparaffin is used. Preferably, the insulating liquid 10 may have the lowest possible viscosity and refractive index. This ensures that the mobility (response speed) of the electrophoretic particles 20 is increased, and accordingly energy (power consumption) necessary for migrating the electrophoretic particles 20 is reduced. Further, the refractive index of the porous layer 30 is increased due to an increased difference in the refractive index between the insulating liquid 10 and the porous layer 30.

It is to be noted that the insulating liquid 10 may contain a variety of materials as appropriate. Examples of such materials may include colorant, charge control agent, dispersion stabilizer, viscosity modifier, surface-active agent, resin, and the like.

[Electrophoretic Particles]

The electrophoretic particles 20 are charged particles that are dispersed in the insulating liquid 10 and are charged to positive or negative polarities, being capable of migrating via the porous layer 30 depending on an electric field. The electrophoretic particles 20 may be configured of particles (powders), such as organic pigment, inorganic pigment, dye, carbon material, metal material, metal oxide, glass, or polymeric material (resin). Also, the electrophoretic particles 20 may be smashed particles, capsule particles, or the like of resin solid content including the above-described particles. It is to be noted that materials that fall under the carbon material, metal material, metal oxide, glass, or polymeric material are to be excluded from materials that fall under the organic pigment, inorganic pigment, or dye.

Examples of the organic pigment may include azo pigment, metal complex azo pigment, polycondensation azo pigment, flavanthrone pigment, benzimidazolone pigment, phthalocyanine pigment, quinacridone pigment, anthraquinone pigment, perylene pigment, perinone pigment, anthrapyridine pigment, pyranthrone pigment, dioxazine pigment, thioindigo pigment, isoindolinone pigment, quinophthalone pigment, indanthrene pigment, and the like. Examples of the inorganic pigment may include zinc oxide, antimony white, carbon black, iron black, titanium boride, red iron oxide, iron oxide yellow, red lead oxide, cadmium yellow, zinc sulfide, lithopone, barium sulfide, cadmium selenide, calcium carbonate, barium sulfate, lead chromate, lead sulfate, barium carbonate, lead white, alumina white, and the like. Examples of the dye may include nigrosine dye, azo dye, phthalocyanine dye, quinophthalone dye, anthraquinone dye, methine dye, and the like. Examples of the carbon material may include carbon black, and the like. Examples of the metal material may include gold, silver, copper, and the like. Examples of the metal oxide may include titanium oxide, zinc oxide, zirconium oxide, barium titanate, potassium titanate, copper-chrome oxide, copper-manganese oxide, copper-iron-manganese oxide, copper-chrome-manganese oxide, copper-iron-chrome oxide, and the like. The polymeric material may be, for example, highly-polymerized compound into which a functional group having a light-absorbing zone in a visible light range is introduced, or the like. If the polymeric material is any highly-polymerized compound having a light-absorbing zone in a visible light range as described above, a type thereof is not limited specifically.

While a content (density) of the electrophoretic particles 20 in the insulating liquid 10 is not limited specifically, it may be, for example, within a range of about 0.1 weight % to about 80 weight % both inclusive. This is because the shielding performance and mobility of the electrophoretic particles 20 are ensured. If the density of the electrophoretic particles 20 is less than about 0.1 weight %, it is less likely that the porous layer will be shielded (concealed). On the other hand, if the density of the electrophoretic particles 20 is more than about 80 weight %, it is less likely that the electrophoretic particles 20 will migrate due to deterioration in the dispersibility of the electrophoretic particles 20, which may cause the electrophoretic particles 20 to become aggregated together in some cases.

As described above, the electrophoretic particles 20 according to this embodiment of the present disclosure are configured of two kinds of particles (first particles 21 and second particles 22). The first particles 21 and the second particles 22 have charges different from each other with either one charged to positive polarities and with the other charged to negative polarities. Consequently, when an electric field is applied, each of the first particles 21 and the second particles 22 migrates toward the corresponding direction within the range in which the electric field is applied. In concrete terms, as shown in FIG. 2, when an electric field is applied from a top-face direction and a bottom-face direction of the electrophoresis device 1 that is divided by the porous layer 30, the first particles 21 and the second particles 22 migrate to a first region 10A and a second region 10B respectively depending on charges that each of the first particles 21 and the second particles 22 has.

The first particles 21 and the second particles 22 are configured of the above-described materials, and the same materials or different materials may be used for each of them. However, preferably, the first particles 21 and the second particles 22 may have the optical reflection characteristics different from each other. For example, preferably, some particles may have the reflection characteristics equivalent to those of the insulating liquid 10, while the other particles may have the reflection characteristics equivalent to those of the porous layer 30 to be hereinafter described. Here, a description is given of an example where the first particles 21 have the reflection characteristics equivalent to those of the insulating liquid 10, while the second particles 22 have the reflection characteristics different from the first particles 21, and the first particles 21 generate the contrast along with the porous layer 30, that is, play the role of performing an image display.

As described above, preferably, the first particles 21 may have the reflection characteristics (reflectivity) equivalent to those of the insulating liquid 10, and may be capable of shielding at least the porous layer 30. This is because the contrast is generated depending on a difference in the reflection characteristics between the first particles 21 and the porous layer 30. Preferably, a particle size for each of the first particles 21 may be, for example, at least about 50 nm but no more than about 300 nm. More preferably, the particle size may be at least about 75 nm but no more than about 200 nm. By increasing the particle size for each of the first particles 21, the memory performance is improved. Further, while a content of the first particles 21 in the insulating liquid 10 is not limited specifically, it may be, for example, within a range of about 0.1 weight % to about 10 weight % both inclusive.

Any material for forming the first particles 21 is selected in accordance with a role that the first particles 21 undertake to generate the contrast. More specifically, among the above-described materials, a material to be used when the first particles 21 perform a dark display may be, for example, a carbon material, metal oxide, or the like. The carbon material may be, for example, a carbon black, or the like. Examples of the metal oxide may include copper-chrome oxide, copper-manganese oxide, copper-iron-manganese oxide, copper-chrome-manganese oxide, copper-iron-chrome oxide, or the like. Above all, the carbon material may be preferable. This is because the excellent chemical stability, mobility, and optical absorption property are assured. On the other hand, a material to be used when the first particles 21 perform a bright display may be a metal oxide, such as titanium oxide, zinc oxide, zirconium oxide, barium titanate, potassium titanate, or the like.

In cases where the first particles 21 perform a dark display, while a color of the first particles 21 that is visible when the electrophoresis device 1 is viewed from the outside is not limited specifically as long as such a color ensures to generate the contrast, any color verge on black may be preferable, and a black color may be more preferable. On the other hand, in cases where the first particles 21 perform a bright display, while a color of the first particles 21 that is visible when the electrophoresis device 1 is viewed from the outside is not limited specifically as long as such a color ensures to generate the contrast, any color verge on white may be preferable, and a white color may be more preferable above all. In either case, this is because the contrast is enhanced.

Preferably, the first particles 21 may be easy to be dispersed and charged in the insulating liquid 10 over an extended time period, while being hard to be absorbed to the porous layer 30. Consequently, for example, preferably, a material having the same charge polarity as the porous layer 30 may be selected for the first particles 21, or a surface treatment may be carried out to charge the first particles 21 to the same polarity as the porous layer 30. In concrete terms, when the porous layer 30 has a negative charged polarity, a negative charge is applied to the top surfaces of the first particles 21 (for example, a modification may be performed by using functional groups having the electron-withdrawing property). On the contrary, when the porous layer 30 has a positive charged polarity, a positive charge is applied to the top surfaces of the first particles 21 (for example, a modification may be performed by using functional groups having the electron-donating property). This initiates an electrostatic repulsion between the first particles 21 and the porous layer 30, thereby suppressing absorption between the first particles 21 and the porous layer 30 and aggregation of the first particles 21. It is to be noted that the functional groups for modifying the top surfaces of the first particles 21 are not limited to the same functional groups, but different functional groups may be introduced if the first particles 21 and the porous layer 30 exhibit charges toward the same direction (positive or negative polarity). Further, instead of a surface treatment, a dispersant such as a charge regulator may be used, or both of the surface treatment and the dispersant may be used together alternatively.

Examples of the dispersant may include the Solsperse series available from Lubrizol Corporation located in Wickliffe, Ohio (USA), the BYK series or the Anti-Terra series available from BYK-Chemie GmbH located in Wesel (Germany), the Span series available from ICI Americas Inc. located in Marlborough, Mass. (USA), or the like.

The second particles 22 are particles for suppressing diffusion of the first particles 21 that perform a dark display or a bright display after electric field removal, and have charges different from the first particles 21 as described above. In this embodiment of the present disclosure, when the display is configured by the electrophoresis device 1 having the configuration discussed above (for example, see FIG. 4), the electrophoretic particles 20 (first particles 21 and second particles 22) may exhibit the following behavior. For example, when a voltage is applied across predetermined electrodes among facing electrodes (pixel electrode 45 and counter electrode 52), an electric field is generated at a predetermined region. At the region in which the electric field is applied, for example, the first particles 21 that are charged to negative polarities may migrate toward an anode (for example, pixel electrode 45) side (second region 10B), while the second particles 22 that are charged to positive polarities may migrate toward a cathode (for example, counter electrode 52) side (first region 10A). On the other hand, at a region in which no electric field is applied, the first particles 21 may remain at the counter electrode 52 side (first region 10A), while the second particles 22 may remain at the pixel electrode 45 side (second region 10B). Accordingly, preferably, the second particles 22 may have the reflectivity different from the first particles 21, for example, the same reflectivity as the porous layer 30 that generates the contrast along with the first particles 21. Alternatively, any material which does not constitute a limiting factor of a display (dark display or bright display) that is performed by the first particles 21 may be used for the second particles 22, and the second particles 22 may be transparent just like the insulating liquid 10. In other words, preferably, a difference in the refractive index between the second particles 22 and the insulating liquid 10 may be equal to or greater than zero. Further, an upper limit of the difference in the refractive index is not limited specifically, but may be permitted to be the same reflectivity as the porous layer 30 if the first particles 21 perform a dark display, while the porous layer 30 performs a bright display. An example thereof may include the reflectivity (about 2.1) of titanium oxide that may be used as a material for the non-electrophoretic particles 32 that are included in the porous layer 30.

Preferably, a particle size for each of the second particles 22 may be equal to or less than that each of the first particles 21, and more preferably, the particle size may be at least about 50 nm but no more than about 200 nm. By making the particle size smaller than that each of the first particles 21, this prevents the second particles 22 from getting stuck inside pores 33 at the time of application of a voltage, which ensures that the first particles 21 migrate smoothly.

Preferably, the additive amount of the second particles 22 may be, for example, within a range of at least about 1:0.5 but no more than about 1:30 as an abundance ratio of the second particles 22 to the first particles 21. While a content of the second particles 22 in the insulating liquid 10 is not limited specifically, it may be, for example, within a range of about 0.1 weight % to about 60 weight % both inclusive. For an electrophoresis device as proposed in Japanese Unexamined Patent Application Publication No. 2012-022296 as described previously, a bright display or a dark display is carried out by migration of electrophoretic particles that is activated through application of an electric field. When the electric field is removed, the electrophoretic particles that are fixed by the electric field diffuse gradually, causing the contrast to be lost accordingly. In this embodiment of the present disclosure, as the electrophoretic particles 20, in addition to the first particles 21 which may be equivalent to the electrophoretic particles in Japanese Unexamined Patent Application Publication No. 2012-022296, the second particles 22 having charges inverse to those of the first particles 21 are used. Consequently, when an electric field is applied, as described above, for example, the first particles 21 may migrate toward the first region, while the second particles 22 may migrate toward a facing region (for example, second region 10B) with the porous layer 30 interposed between. After electric field removal, the first particles 21 diffuse gradually, although a diffusion speed via the porous layer 30 is reduced because of presence of the second particles 22 at the second region 10B. In other words, it is possible to suppress the diffusion of the first particles 21 after the electric field removal.

To suppress the diffusion of the first particles 21 after the electric field removal by means of the second particles 22, preferably, the additive amount of the second particles 22 may be kept within the above-described range. When an abundance ratio of the second particles 22 is less than about 0.5, the first particles 21 may diffuse easily toward the second region 10B side because an occupancy ratio of the second particles 22 at a region (for example, second region 10B) on the side opposite to a region where the first particles 21 are present after removal of any applied voltage is low. As a result, this may make it difficult to fully suppress diffusion of the first particles 21. On the other hand, when the abundance ratio of the second particles 22 is more than about 30, the second particles 22 are present not only at the second region 10B but also within the pores 33 that are migration paths for each of the particles. Consequently, this improves the memory performance, although it prevents the first particles 21 from migrating during switching of images, which may cause the response speed to be lowered. It is to be noted that the abundance ratio of the second particles 22 to the first particles 21 may be more preferably within a range of at least about 1:10 but no more than about 1:15. This makes it possible to maintain the excellent response speed, while improving the memory performance. It is to be noted that the "abundance ratio" is interchangeable with a weight ratio, being equivalent to the number of the second particles 22.

[Porous Layer]

The porous layer 30 is a three-dimensional solid structure that is formed of a fibrous structure 31, and has the plurality of the pores 33 that are formed of such three-dimensional solid structure. The pores 33 are migration paths for the electrophoretic particles 20 (first particles 21 and the second particles 22) at the time of application of a voltage. The fibrous structure 31 contains the plurality of the non-electrophoretic particles 32, which are held by the fibrous structure 31. The porous layer 30 has a positive or negative polarity depending on either or both of the fibrous structure 31 or/and the non-electrophoretic particles 32. In the electrophoresis device 1 according to this embodiment of the present disclosure, a configuration is made in such a manner that the electrophoretic particles 20 and the porous layer 30 have the same charges, although, preferably, for preparation of each of the charges, charged polarities of the electrophoretic particles 20 may be made consistent with a charged polarity of the porous layer 30 as described above. This is because any deterioration in the characteristics as the display that is caused by variations in hole diameters of the pores 33 and the light reflection characteristics due to modification of the porous layer 30 is prevented.

In the porous layer 30 as the three-dimensional solid structure, a single fibrous structure 31 may be entwined at random, or the plurality of the fibrous structures 31 may be gathered and overlap with each other at random, or both of such configurations may be mixed. In the case of the plurality of the fibrous structures 31, each of the fibrous structures 31 holds one or two or more non-electrophoretic particles 32. It is to be noted that FIG. 2 shows a case where the porous layer 30 is formed of the plurality of the fibrous structures 31.

One reason why the porous layer 30 is the three-dimensional solid structure that is formed of the fibrous structure 31 is that the reflectivity of the porous layer 30 is increased by virtue of diffused reflection (multiple scattering) of light (outside light), and there is no necessity for increasing a thickness of the porous layer 30 to achieve such high reflectivity. This enhances the contrast of the electrophoresis device 1, while reducing energy necessary for migrating the electrophoretic particles 20. Further, because average hole diameters of the pores 33 become larger, and the number of the pores 33 increases, the electrophoretic particles 20 are easy to migrate via the pores 33. As a result, this increases the response speed, while reducing energy necessary for migrating the electrophoretic particles 20.

The fibrous structure 31 is a fibrous material having a sufficient length with respect to a fiber diameter (diameter). The fibrous structure 31 may be, for example, configured of one kind of, or two or more kinds of a polymeric material, inorganic material, or the like, or any other materials. Examples of the polymeric material may include nylon, polylactic acid, polyamide, polyimide, polyethylene terephthalate, polyacrylonitrile (PAN), polyethylene oxide, polyvinyl carbazole, polyvinyl chloride, polyurethane, polystyrene, polyvinyl alcohol, polysulfone, polyvinyl pyrrolidone, polyvinylidene fluoride, polyhexafluoropropylene, cellulose acetate, collagen, gelatin, chitosan, copolymer of the above-described materials, and the like. The inorganic material may be, for example, titanium oxide, or the like. Above all, as a material for forming the fibrous structure 31, the polymeric material may be preferable. This is because unintended decomposition reaction of the fibrous structure 31 is suppressed since polymeric material exhibits lower reactivity (optical reactivity and the like), that is, chemical stability. It is to be noted that when the fibrous structure 31 is formed of any material having the high reactivity, the top surface of the fibrous structure 31 may be preferably covered with any protective layer (not shown in the figure).

A shape (external appearance) of the fibrous structure 31 is not limited specifically, as long as it takes a fibrous form having a sufficient length with respect to a fiber diameter as described above. In concrete terms, the fibrous structure 31 may take a linear shape, or may be crinkled, or folded in the middle. Further, the fibrous structure 31 may not only extend in one direction, but also diverge in one direction, or two or more directions in the middle. While a method of forming the fibrous structure 31 is not limited specifically, preferably, a phase separation method, phase inversion method, electrostatic (electric field) spinning method, melt spinning method, wet spinning method, dry spinning method, gel spinning method, sol-gel process, spray coating method, or the like may be adopted. This is because a fibrous material having a sufficient length with respect to a fiber diameter is easy to be formed with high stability.

While a fiber diameter of the fibrous structure 31 is not limited specifically, preferably, the fiber diameter may be as small as possible. This is because diffused reflection of light takes place easily, and hole diameters of the pores 33 become larger. However, it is necessary to determine the fiber diameter to ensure that the fibrous structure 31 is capable of holding the non-electrophoretic particles 32 to be hereinafter described. Therefore, preferably, the fiber diameter of the fibrous structure 31 may be at least about 50 nm but no more than about 2000 nm. Further, preferably, an average fiber diameter thereof may be less than about 10 μm. It is to be noted that while a lower limit of the average fiber diameter is not limited specifically, it may be, for example, about 0.1 μm or less. The fiber diameter and the average fiber diameter may be measured through microscopic observation using, for example, a scanning electron microscope, or the like. It is to be noted that an average length of the fibrous structure 31 may be optional.

In particular, preferably, the fibrous structure 31 may be a nanofiber. This is because the reflectivity of the porous layer 30 is further increased since diffused reflection of light takes place easily, and the electrophoretic particles 20 are easy to migrate via the pores 33 since a proportion occupied by the pores 33 in a unit volume is raised. This enhances the contrast, while further reducing energy necessary for migrating the electrophoretic particles 20. A nanofiber is a fibrous material a fiber diameter of which is within a range of about 0.001 μm to about 0.1 μm both inclusive, and a length of which is about one hundred times as large as the fiber diameter or over. Preferably, the fibrous structure 31 which is the nanofiber may be formed using an electrostatic spinning method. This makes it easy to form the fibrous structure 31 with a small fiber diameter with high stability.

Preferably, the fibrous structure 31 may have the reflection characteristics different from those of the electrophoretic particles 20. In concrete terms, while the reflection characteristics of the fibrous structure 31 are not limited specifically, preferably, at least the whole porous layer 30 may be capable of shielding the electrophoretic particles 20. As described previously, this is because the contrast is generated by the difference in the reflection characteristics between the electrophoretic particles 20 and the porous layer 30. Therefore, the fibrous structure 31 with the optical transparency (transparent and colorless) in the insulating liquid 10 may not be preferable. However, in the case where the reflection characteristics of the fibrous structure 31 have almost negligible effect on the reflection characteristics of the porous layer 30 and are essentially determined by the reflection characteristics of the non-electrophoretic particles 32, the reflection characteristics of the fibrous structure 31 may be optional.

While an average hole diameter for each of the pores 33 is not limited specifically, preferably, it may be as large as possible. This is because the electrophoretic particles 20 are easy to migrate via the pores 33. Therefore, preferably, an average hole diameter for each of the pores 33 may be within a range of about 0.01 μm to about 10 μm both inclusive.

While a thickness of the porous layer 30 is not limited specifically, it may be, for example, within a range of about 5 μm to about 100 μm both inclusive. This is because the shielding performance of the porous layer 30 is raised, and the electrophoretic particles 20 are easy to migrate via the pores 33.

The non-electrophoretic particles 32 are held (fixed) by the fibrous structure 31 and are particles that perform no electrophoretic migration. The fibrous structure 31 includes the plurality of the non-electrophoretic particles 32, thereby facilitating diffused reflection of light and further raising the contrast of the electrophoresis device 1. It is to be noted that the non-electrophoretic particles 32 may be partially exposed from the fibrous structure 31, or may be buried into the fibrous structure 31 as long as the non-electrophoretic particles 32 are held by the fibrous structure 31.

The non-electrophoretic particles 32 have the reflection characteristics different from those of the electrophoretic particles 20. While the reflection characteristics of the non-electrophoretic particles 32 are not limited specifically, preferably, at least the whole porous layer 30 may be capable of shielding the electrophoretic particles 20. As described previously, this is because the contrast is generated by the difference in the reflection characteristics between the electrophoretic particles 20 and the porous layer 30. It is to be noted that, in this embodiment of the present disclosure, the optical reflectance of the non-electrophoretic particles 32 is higher than that of the first particles 21.

A material for forming the non-electrophoretic particles 32 is selected in accordance with a role that the non-electrophoretic particles 32 undertake to generate the contrast. More specifically, a material to be used when the non-electrophoretic particles 32 perform a bright display is the same as a material to be selected when the first particles 21 perform a bright display. On the other hand, a material to be used when the non-electrophoretic particles 32 perform a dark display is the same as a material to be selected when the first particles 21 perform a dark display. Above all, as a material to be selected when the non-electrophoretic particles 32 perform a bright display, a metal oxide material may be preferable. This is because the excellent chemical stability, fixity, and light reflectivity are assured. As long as it is possible to generate the contrast, a material for forming the non-electrophoretic particles 32 may be of the same kind as, or of the different kind from a material for forming the electrophoretic particles 20 (first particles 21 and second particles 22). It is to be noted that a color that is visible when the non-electrophoretic particles 32 perform a bright display or a dark display is the same as with a case where the description is provided on a color by which the electrophoretic particles 20 are visible.

1-2. Method of Preparing Electrophoretic Particles

As described above, the first particles 21 and the second particles 22 that structure the electrophoretic particles 20 have polarities different from each other, and, for example, the first particles 21 may have charges of the same polarity as the porous layer 30, while the second particles 22 may have charges of the polarity inverse to that of the first particles 21. It is possible to prepare the charged polarity for each of the particles 21 and 22 using a surface treatment to be hereinafter described, in addition to use of each material having a desired polarity.

Examples of the surface treatment may include a rosin treatment, surface-active agent treatment, pigment derivative treatment, coupling agent treatment, graft polymerization treatment, microencapsulation treatment, and the like. Among them, the coupling agent treatment, graft polymerization treatment, microencapsulation treatment, or a combination of those treatments may be preferable. This is because a long-term dispersion stability and the like are assured.

A material for the surface treatment may be, for example, a material having a functional group capable of being absorbed to the top surfaces of the electrophoretic particles 20 (first particles 21 and second particles 22) and a polymeric functional group (absorbent material), or the like. A type of an absorbable functional group may be determined in accordance with a material for forming the electrophoretic particles 20. To take an example, aniline derivative such as 4-vinyl aniline may be used for a case of a carbon material such as carbon black, and organosilane derivative such as 3-(trimethoxysilyl) propyl methacrylate may be used for a case of a metal oxide material. Examples of a polymeric functional group may include a vinyl group, acrylic group, methacrylic group, and the like.

Alternatively, a material for the surface treatment may be, for example, a material capable of grafting to the top surfaces of the electrophoretic particles 20 to which polymeric functional groups are introduced (grafting material). Preferably, this grafting material may have a polymeric functional group, and a functional group for dispersion that is capable of being dispersed in the insulating liquid 10 and holding the dispersibility by virtue of steric constraint. A type of the polymeric functional group may be the same as with a case where the description is provided on the absorbent material. The functional group for dispersion may be, for example, a divergent alkyl group or the like when the insulating liquid 10 is paraffin. To polymerize or graft the grafting material, a polymerization initiator such as azobisisobutyronitrile (AIBN) may be used.

For reference, detailed information on a method of dispersing the electrophoretic particles 20 in the insulating liquid 10 as described above is contained in a book, such as "Dispersion Technology of Ultrafine Particles and Evaluation Thereof—Surface Treatment, Pulverizing, and Dispersion Stabilization in Air/Liquid/Polymer Molecule (Science & Technology Co., Ltd.)".

Figure 3:
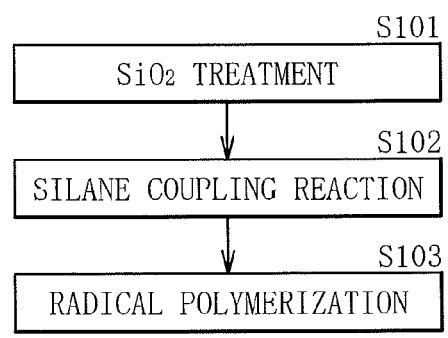
FIG. 3 is a flow chart showing preparation steps of electrophoretic particles.

An example for a method of preparing the electrophoretic particles 20 (first particles 21 in this example) may be as follows. FIG. 3 represents a flow of procedures for preparing the first particles 21. First, for example, as a step S101 ($SiO_2$ treatment), a solution A may be prepared by solving sodium hydroxide and sodium silicate in water. Subsequently, the solution A, to which, for example, complex oxide fine particles (DAIPYROXIDE Color TM3550 available from Dainichiseika Color & Chemicals Mfg. Co., Ltd. located in Tokyo, Japan) may be added, is heated, and then, for example, sulfuric acid of about 1 mol/cm$^3$, and aqueous solution in which sodium silicate and sodium hydroxide are solved may be dropped into the resultant solution A. Next, for example, as a step S102 (silane coupling reaction), liquid mixture of ethanol and water may be added to derive a solution with dispersed silane-covered complex oxide particles. Subsequently, for example, water, ethanol, and allyltriethoxysilane may be mixed, and then the above-described solution with dispersed silane-covered complex oxide particles may be added to prepare the mixed solution. Next, a solid substance is obtained after a posttreatment of this mixed solution, and this solid substance, to which, for example, toluene is added, may be stirred to prepare a solution B. Thereafter, as a step S103 (radical polymerization), for example, acrylic acid and 2,5-dimethyl-1,5-hexadiene may be added to the solution B, and then the resultant solution B may be stirred under a nitrogen gas stream. Afterward, polymerization reaction of the first particles 21 is induced in such a manner that a solution C in which, for example, 2,2'-azobis (2-methylpropionitrile) (azobisisobutyronitrile: AIBN) is solved into toluene may be mixed with this solution B. Such steps obtain the black-color first particles 21 that are configured of polymer-covered pigments.

[Preferable Method of Displaying Electrophoresis Device]

As described above, in the electrophoresis device 1, each of the first particles 21 and the porous layer 30 (fibrous structure 31 including the non-electrophoretic particles 32) performs a bright display and a dark display, thereby generating the contrast. In this case, the first particles 21 may perform a bright display, while the porous layer 30 may perform a dark display, and vice versa. Such a difference in a role is determined by a relationship of the reflection characteristics between the first particles 21 and the porous layer 30. In other words, the reflectivity of one that undertakes a bright display becomes higher than that of the other that undertakes a dark display.

Above all, preferably, the first particles 21 may perform a dark display, while the porous layer 30 may perform a bright display. In association with this, when the optical characteristics of the porous layer 30 are essentially determined by the reflection characteristics of the non-electrophoretic particles 32, preferably, the reflectivity of the non-electrophoretic particles 32 may be higher than that of the first particles 21. This is because the reflectivity for a bright display in this case is increased significantly by the use of diffused reflection of light passing through the porous layer 30 (three-dimensional solid structure), and thus accordingly the contrast is also increased significantly.

[Operation of Electrophoresis Device]

In the electrophoresis device 1, the electrophoretic particles 20 (first particles 21 in this case) and the porous layer 30 (non-electrophoretic particles 32) are different in the reflection characteristics. In such a case, when an electric field is applied to the electrophoresis device 1, the first particles 21 migrate toward one region, for example, the first region 10A via the porous layer 30 (pores 33) within the range where the electric field is applied. As a result, when the electrophoresis device 1 is viewed from the side where the first particles 21 have migrated, a dark display (or bright display) is performed by the first particles 21 in the range where the first particles 21 migrate, while a bright display (or dark display) is performed by the porous layer 30 in the range where the first particles 21 do not migrate. This generates the contrast. That is, this displays images.

In an existing electrophoresis device, when an electric field is removed, electrophoretic particles that have migrated toward one region are gradually diffused to migrate toward the other side of region which is divided by a porous layer. Along with such a migration of the electrophoretic particles, the contrast deteriorates between a region where an electric field is applied and a region where no electric field is applied, causing images that have been viewed on a display panel to be gradually lost. Consequently, to hold images on a display panel, it is necessary to continue to apply voltages constantly, which poses an impediment to reduction of the power consumption.

To reduce the power consumption, a method may be contemplated to achieve a performance to hold images without supplying any power as described above, that is, to adopt a method for giving the memory performance. For giving the memory performance to an electrophoresis device, an electrical image force that is generated between electrodes and electrophoretic particles becomes an important parameter. It is possible to express the electrical image force using Expression (1) given below.

(Expression 1)

$$F \propto q^2 / 4\pi \epsilon r^2 \tag{1}$$

Expression 1 shows that it is effective to raise the electrical image force, that is, to make electrophoretic particles hold high charges for giving the memory performance to an electrophoresis device. Further, if it is assumed that the electrophoretic particles have the same charge density, a relationship represented by Expression 2 given below is established. Based on this, to make the electrophoretic particles hold high charges, a method of increasing a particle size for each of the electrophoretic particles may be contemplated.

(Expression 2)

$$F \propto r^3/4\pi\epsilon r^2 = r/3\pi\epsilon \qquad (2)$$

However, an increase in the particle size for each of the electrophoretic particles ensures to achieve the excellent memory performance, although this may pose a disadvantage of deterioration in the permeability of the electrophoretic particles through a porous layer, causing the contrast to be reduced. In other words, it has been proved that a method of increasing the particle size for each of the electrophoretic particles makes it difficult to improve the memory performance while maintaining the display image quality of an electrophoresis device.

[Operation and Effects]

On the contrary, in this embodiment of the present disclosure, as the electrophoretic particles 20, the first particles 21 that perform a bright display or a dark display of a display panel, as well as the second particles 22 having different charged polarities from the first particles 21 are used. The second particles 22 do the reverse of the first particles 21 at the time of application of an electric field. In concrete terms, when an electric field is applied, if the first particles 21 migrate toward the second region 10B side within the range where the electric field is applied, the second particles 22 migrate toward the first region 10A side within the range where the electric field is applied. This reduces a difference in the particle density (concentration) of the insulating liquid 10 at the first region 10A and the second region 10B after removal of the electric field, leading to suppression of diffusion of the first particles 21 into the second region 10B side. As a result, the contrast between a dark display region and a bright display region is maintained even if the electric field is removed.

Further, when a voltage is applied across the facing electrodes (pixel electrode 45 and counter electrode 52), the first particles 21 and the second particles 22 migrate toward respective corresponding electrode surfaces. Consequently, an electrical image force is exerted on both the pixel electrode 45 and counter electrode 52. In other words, it is thought that charges are balanced on each of the facing electrodes, thereby obtaining a greater electrical image force without increasing a particle size for each of the first particles 21 at the sacrifice of the contrast as described above.

As described above, in the electrophoresis device 1 according to this embodiment of the present disclosure, in addition to the first particles 21, the second particles 22 having charges opposite to the first particles 21 are used as the electrophoretic particles 20. Thus, any diffusion of the first particles 21 after removal of an electric field is suppressed, resulting in improvement of the memory performance. This makes it possible to hold viewing images on a display panel without continuing to apply voltages constantly, which allows to provide a display with less power consumption.

2. Application Example

Next, the description is provided on an application example of the above-described electrophoresis device 1. The electrophoresis device 1 is applicable to a variety of electronic apparatuses. For example, the electrophoresis device 1 may be applied to a display, although types of electronic apparatuses are not limited specifically.

[Overall Configuration of Display]

Figure 4:
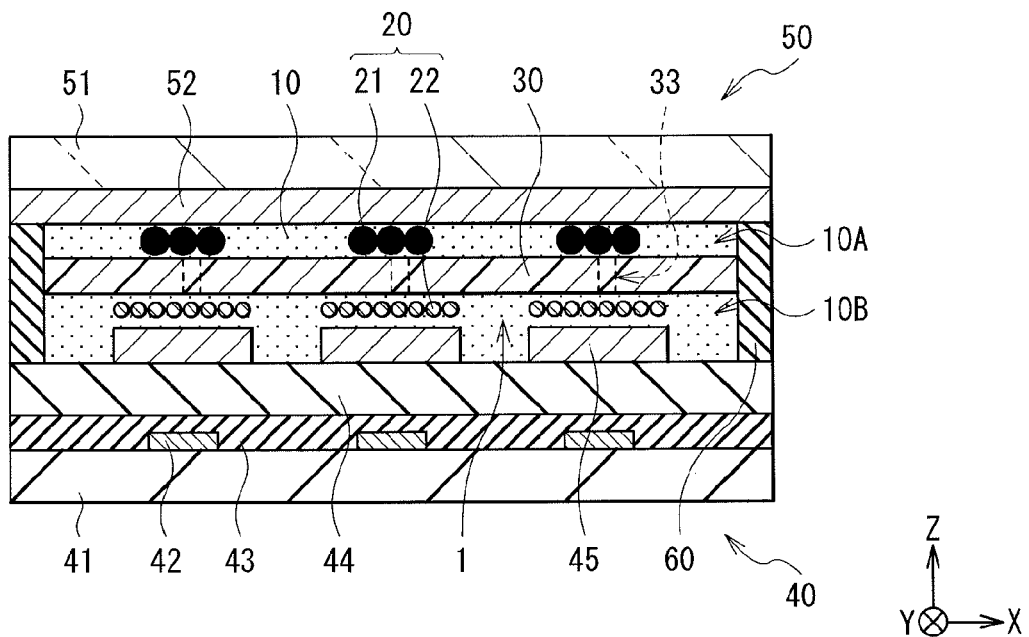
FIG. 4 is a cross-sectional view showing a configuration of a display using the electrophoresis device according to an embodiment of the present disclosure.
Figure 5:
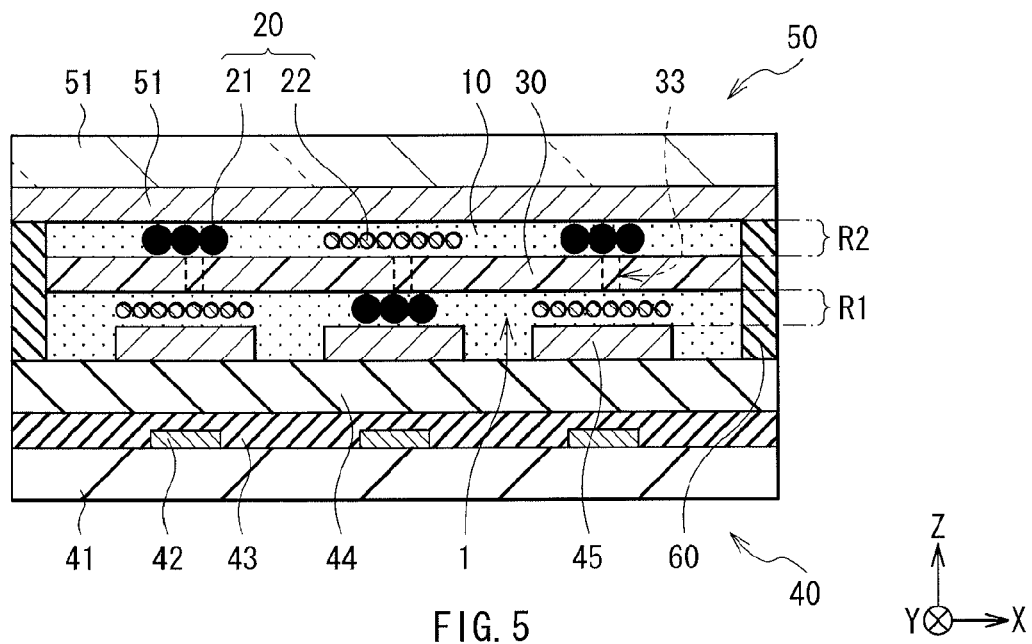
FIG. 5 is a cross-sectional view for explaining an operation of the display.

FIG. 4 shows a cross-sectional structure of a display, while FIG. 5 is a cross-sectional view for explaining an operation of the display illustrated in FIG. 4. It is to be noted that a configuration of the display to be hereinafter described represents one example for reference, and the configuration may be modifiable as appropriate.

The display is an electrophoretic display (so-called electronic paper display) that displays images (for example, textual information, and the like) utilizing an electrophoretic phenomenon. In this display, as shown in an example in FIG. 4, a driving substrate 40 and a facing substrate 50 may be disposed in opposition to one another via the electrophoresis device 1 according to the above-described embodiment of the present disclosure, and, for example, images may be displayed at the facing substrate 50 side. It is to be noted that the driving substrate 40 and the facing substrate 50 are separated at predetermined spacing intervals by a spacer 60.

[Driving Substrate]

On the driving substrate 40, for example, a plurality of thin-film transistors (TFTs) 42, a protective layer 43, a planarizing insulating layer 44, and a plurality of pixel electrodes 45 may be formed in this order on one side of a support base material 41. The TFTs 42 and the pixel electrodes 45 are disposed in a matrix pattern or a segment pattern depending on the pixel arrangement.

The support base material 41 may be formed of, for example, an inorganic material, metallic material, plastic material, or the like. Examples of the inorganic material may include silicon (Si), silicon oxide (SiOx), silicon nitride (SiNx), aluminum oxide (AlOx), and the like. The silicon oxide may include glass, spin-on-glass, or the like. Examples of the metallic material may include aluminum (Al), nickel (Ni), stainless steel, and the like. Examples of the plastic material may include polycarbonate (PC), polyethylene terephthalate (PET), polyethylene naphthalate (PEN), polyether ether ketone (PEEK), and the like.

The support base material 41 may be optically transparent or may be not optically transparent. This is because the support base material 41 does not necessarily have to be optically transparent since images are displayed at the facing substrate 50 side. Further, the support base material 41 may be a substrate having the rigidity, such as a wafer, or may be a thin-layer glass or film having the flexibility, although the latter may be preferable among them. This is because the flexible (foldable) display is achieved.

The TFT 42 is a switching device for selecting pixels. It is to be noted that the TFT 42 may be an inorganic TFT using an inorganic semiconductor layer, or an organic TFT using an organic semiconductor layer as a channel layer. The protective layer 43 and the planarizing insulating layer 44 may be formed of, for example, insulating resin materials like polyimide. However, as long as the top surface of the protective layer 43 is fully planarized, the planarizing insulating layer 44 may be omitted. The pixel electrode 45 may be formed of, for example, a metallic material, such as gold (Au), silver (Ag), or copper (Cu). The pixel electrode 45 is connected with the TFT 42 via contact holes (not shown in the figure) that are provided on the protective layer 43 and the planarizing insulating layer 44.

[Facing Substrate]

The facing substrate 50 may be, for example, a substrate on which the counter electrodes 52 are formed over a whole surface at one side of the support base material 41. However, the counter electrodes 52 may be disposed in a matrix pattern or a segment pattern as with the pixel electrodes 45.

A support base material 51 may be formed of the same material as the support base material 41, except for the optical transparency. This is because it is desirable for the support base material 51 to be optically transparent since images are displayed at the facing substrate 50 side. The counter electrode 52 may be formed of, for example, an optically transparent conducive material (transparent electrode material), such as indium oxide-tin oxide (ITO), antimony oxide-tin oxide (ATO), fluoride-doped tin oxide (FTO), aluminum-doped zinc oxide (AZO), or the like.

When images are displayed at the facing substrate 50 side, because the electrophoresis device 1 is seen via the counter electrode 52, preferably, the optical transparency (transmittance) of the counter electrode 52 may be as high as possible, for example, about 80% or more. Further, preferably, the electric resistance of the counter electrode 52 may be as low as possible, for example, about 100 ohms or less per square.

[Electrophoresis Device]

The electrophoresis device 1 includes the plurality of first particles 21 and second particles 22 as the electrophoretic particles 20, as well as the porous layer 30 having the plurality of pores 33 in the insulating liquid 10. The insulating liquid 10 is filled up at a space between the driving substrate 40 and the facing substrate 50, and the porous layer 30 may be supported by, for example, the spacer 60. The space where the insulating liquid 10 is filled up is divided into the first region 10A at the side close to the pixel electrode 45 and the second region 10B at the side close to the counter electrode 52 with the porous layer 30 interposed between as a boundary. The configurations of the insulating liquid 10, the electrophoretic particles 20, and the porous layer 30 are the same as those of the insulating liquid 10, the electrophoretic particles 20, and the porous layer 30 in the above-described embodiment of the present disclosure, respectively. It is to be noted that each of FIG. 4 and FIG. 5 shows only a part of the pores 33 for simplified representation.

[Spacer]

The spacer 60 may be formed of, for example, an insulating material like a polymeric material.

While a shape of the spacer 60 is not limited specifically, a shape ensuring to pose no impediment to migration of the electrophoretic particles 20 and to distribute the electrophoretic particles 20 evenly, for example, a lattice shape may be preferable. Further, while a thickness of the spacer 60 is not limited specifically, preferably, the thickness may be as small as possible, for example, may be within a range of about 10 µm to about 100 µm both inclusive for the purpose of reducing the power consumption.

[Operation of Display]

In this display, as shown in FIG. 4, in an initial state, the plurality of the first particles 21 are located at the first region 10A, and the plurality of the second particles 22 are located at the second region 10B. In this case, because the porous layer 30 is shielded by the first particles 21 in all the pixels, when viewed from the facing substrate 50 side, the display is placed in a state where no contrast is generated (no images are displayed).

When pixels are selected by the TFT 42, and an electric field is applied between the pixel electrode 45 and the counter electrode 52, as shown in FIG. 5, the first particles 21 migrate from the first region 10A via the porous layer 30 (pores 33) toward the second region 10B. In this case, because pixels where the porous layer 30 is shielded by the first particles 21 and pixels where the porous layer 30 is not shielded by the first particles 21 are coexistent, when viewed from the facing substrate 50 side, the display is placed in a state where the contrast is generated. This allows images to be displayed.

[Operation and Effects of Display]

According to this display, the electrophoresis device 1 according to the above-described embodiment of the present disclosure is used. Hence, the diffusion of the first particles 21 after removal of an electric field is suppressed to improve the memory performance. This makes it possible to hold viewing images on a display panel without continuing to apply voltages constantly, which allows to provide the display with less power consumption.

3. Working Examples

Next, the detailed description is provided on working examples of one embodiment of the present technology.

Experimental Example 1

Following the procedures given below, the display was fabricated using the electrophoretic particles 20 (first particles 21 in black color (for dark display) and second particles 22 in white color) as well as the porous layer 30 (particle-containing fibrous structure) in white color (for bright display).

[Preparation of Electrophoretic Particles]

First, a solution A was prepared by solving sodium hydroxide of 43 g and sodium silicate of 0.37 g in water of 43 g. Subsequently, the solution A, to which complex oxide fine particles (DAIPYROXIDE Color TM3550 available from Dainichiseika Color & Chemicals Mfg. Co., Ltd. located in Tokyo, Japan) of 5 g are added, was stirred (for 15 minutes), and then ultrasonic agitation was carried out (at 30 to 35 degrees centigrade, for 15 minutes). Next, after the solution A was heated up to 90 degrees centigrade, sulfuric acid of 0.22 mol/cm$^3$ in volume of 15 cm$^3$, and aqueous solution in volume of 7.5 cm$^3$ in which sodium silicate of 6.5 mg and sodium hydroxide of 1.3 mg had been solved were dropped into the resultant solution A for two hours. Next, the solution A was cooled (at room temperature), and then sulfuric acid of 1 mol/cm$^3$ in volume of 1.8 cm$^3$ was added. Subsequently, after centrifugal separation (at 3700 rpm, for 30 minutes) and decantation were performed, the resultant solution A was redispersed in ethanol, and further centrifugal separation (at 3500 rpm, for 30 minutes) and decantation were performed twice. Thereafter, a liquid mixture of ethanol in volume of 5 cm$^3$ and water in volume of 0.5 cm$^3$ was added to each bottle, and ultrasonic agitation was carried out (for one hour) to prepare a solution with dispersed silane-covered complex oxide particles.

Next, the solution with the dispersed silane-covered complex oxide particles was mixed with a solution in which water of 3 cm$^3$, ethanol of 30 cm$^3$, and allyltriethoxysilane of 2 g had been mixed to be stirred (for seven minutes), and then stirring (for ten minutes) and centrifugal separation (at 3500 rpm, for 30 minutes) were carried out. Subsequently, after decantation was performed, redispersion into ethanol and centrifugal separation (at 3500 rpm, for 30 minutes) were performed twice as a cleaning work. Further, after drying for six hours under reduced pressure environment (at room temperature), the resultant solution was heated up to 70 degrees centigrade for drying for two hours. Thereafter, toluene of 50 cm$^3$ was added to prepare a solution B, which was then stirred using a roll mill (for 12 hours). Afterward, acrylic acid of 0.5 g and 2,5-dimethyl-1,5-hexadiene of 2.0 g were added to the solution B, and then the resultant solution B was stirred under a nitrogen gas stream (for 20 minutes). Further, after the solution B was heated up to 50 degrees centigrade, and was stirred (for 20 minutes), a toluene solution with solved AIBN of 0.01 g (3 cm$^3$, solution C) was added to this solution B, and the resultant solution was heated up to 65 degrees centigrade, and was stirred for one hour. Next, after cooling down to the room temperature, ethyl acetate was added, and then centrifugal separation (at 3500 rpm, for 30 minutes) was performed. Subsequently, after decantation was performed, redispersion into ethyl acetate and centrifugal separation (at 3500 rpm, for 30 minutes) were performed three times as a cleaning work. Further, after drying for 12 hours under reduced pressure environment (at room temperature), the resultant solution was heated up to 70 degrees centigrade for drying for two hours. Such procedures obtained black-color electrophoretic particles (first particles 21) each of which is configured of a polymer-covered pigment with a particle size of 160 nm.

[Preparation of Insulating Liquid]

Next, for preparation of the insulating liquid 10, an organic solution containing 1.0% of N,N-dimethylpropane-1,3-diamine, 12-hydroxyoctadecanoic acid, and methoxy-sulfonyloxymethane (Solsperse17000 available from Lubrizol Corporation located in Wickliffe, Ohio (USA)), 5.0% of sorbitan trioleate (Span85), and 94% of isoparaffin (IsoparG available from Exxon Mobil Corporation located in Irving, Tx (USA)) that is a primary constituent was prepared. Here, the above-described black-color electrophoretic particles of 0.3 g as the first particles 21 and silica particles (particle size of 100 nm) of 0.65 g as the second particles 22 were added to the insulating liquid of 9.4 g, and the resultant liquid was stirred (for one hour) using a beads mill with added glass beads (outer diameter of 0.8 mm). Subsequently, the insulating liquid 10 was filtered using a glass fiber filter to remove the beads, thereby obtaining the insulating liquid with the dispersed electrophoretic particles 20 (first particles 21 and second particles 22).

[Preparation of Porous Layer]

Subsequently, as a material for forming the fibrous structure 31, a solution D was prepared by solving polyacrylonitrile (available from Sigma-Aldrich Co. located in St Louis, Mo. (USA); molecular weight of 150000) of 12 g into DMF of 88 g. Next, as the non-electrophoretic particles 32, for example, titanium oxide (TITONE R-42 available from Sakai Chemical Industry Co., Ltd. located in Osaka, Japan) of 40 g was added to the solution D, and then the resultant solution was mixed using a beads mill to obtain a spinning solution. Thereafter, this spinning solution was injected into a syringe, and eight-reciprocating fiber spinning was performed using an electro spinning machine (NANON available from Mecc Co., Ltd. located in Fukuoka, Japan) on a glass substrate on which pixel electrodes (ITO) in predetermined pattern shapes were formed. A fiber spinning condition included a field intensity of 28 kV, discharge rate of 0.5 cm$^3$/minute, fiber spinning distance of 15 cm, and scan rate of 20 mm/second. Subsequently, the glass substrate was dried in a vacuum oven (at 75 degrees centigrade) for 12 hours to form the fibrous structure 31 including the non-electrophoretic particles 32.

[Assembly of Display]

First, any unwanted fibrous structures 31 that are attached to a region where no pixel electrode is formed were removed from a glass substrate on which the pixel electrode 45 is formed, and then a PET film (thickness of 30 μm) was provided as a spacer on a glass substrate on which the counter electrode 52 (ITO) is formed at the front side. On this spacer, a glass substrate on which the pixel electrode 45 and the fibrous structure 31 are formed was overlapped. It is to be noted that, at a location that does not overlap with the porous layer 30, a photo-curing resin (photosensitive resin Photorec A-400 available from Sekisui Chemical Co., Ltd. located in Osaka, Japan) containing beads (outer diameter of 30 μm) was drawn. Finally, after the insulating liquid with the dispersed electrophoretic particles 20 was injected into a gap space between two glass substrates, these glass substrates were wholly pressed with a roller to extend the porous layer 30 between the pixel electrode 45 and the counter electrode 52, and then the glass substrates were wholly pressed again for compression.

In addition, experiments (experimental examples 2 to 7) were made by changing the additive amount, particle size, or a material of the second particles 22. Further, an experiment without adding the second particles 22 (experimental example 8) was made as a comparative example. Table 1 is a list of the additive amount and particle size of the second particles 22, as well as an abundance ratio of the first particles 21 to the second particles 22 in the experimental examples 1 to 8. Table 2 is a list of measurement results for the black reflectivity (%), white reflectivity (%), and the contrast ratio in the experimental examples 1 to 8.

In measuring the black reflectivity and white reflectivity, the reflectivity in a normal line direction of a substrate with respect to a standard diffusing plate in 45-degree ring illumination was measured using a spectrophotometer (YOKOGAWA SPECTROCOLORIMETER CD100 available from Yokogawa Meters & Instruments Corporation located in Tokyo, Japan). A voltage ensuring that the reflectivity values of a black display and a white display are stabilized was used as a driving voltage (15 V in this case), and the reflectivity in each display state was specified as the black reflectivity and white reflectivity. The contrast ratio is a value obtained in a manner of dividing the white reflectivity by the black reflectivity. The memory performance is a result obtained by measuring the contrast after stopping application of a voltage one minute later, five minutes later, and 30 minutes later.

TABLE 1

|  | Second Particles | | | Abundance Ratio |
| --- | --- | --- | --- | --- |
|  | Material | Particle Size (nm) | Additive Amount (g) | (First Particles to Second Particles) |
| Experimental Example 1 | Silica Gel | 100 | 0.65 | 1:5 |
| Experimental Example 2 | Silica Gel | 100 | 0.3 | 1:2 |
| Experimental Example 3 | Silica Gel | 100 | 2 | 1:15 |
| Experimental Example 4 | Silica Gel | 100 | 4 | 1:30 |
| Experimental Example 5 | Silica Gel | 200 | 0.65 | 1:5 |
| Experimental Example 6 | Silica Gel | 35 | 0.65 | 1:5 |
| Experimental Example 7 | Titanium Oxide | 90 | 1.5 | 1:5 |
| Experimental Example 8 | — | — | — | — |

TABLE 2

|  | White Reflectivity (%) | Black Reflectivity (%) | Contrast | Memory Performance | | |
|---|---|---|---|---|---|---|
|  |  |  |  | One minute later | Five minutes later | 30 minutes later |
| Experimental Example 1 | 40 | 2 | 20 | Good | Good | Poor |
| Experimental Example 2 | 42 | 2 | 21 | Good | Poor | Poor |
| Experimental Example 3 | 40 | 2 | 20 | Good | Good | Good |
| Experimental Example 4 | 32 | 4 | 8 | Good | Good | Good |
| Experimental Example 5 | 30 | 3 | 10 | Good | Good | Good |
| Experimental Example 6 | 40 | 2 | 20 | Poor | Poor | Poor |
| Experimental Example 7 | 46 | 2 | 23 | Good | Good | Good |
| Experimental Example 8 | 44 | 2 | 22 | Poor | Poor | Poor |

It is seen from Table 2 that, in the experimental examples 1 to 5 and the experimental example 7 where the second particles 22 were added, the memory performance was improved as compared with the experimental example 8 where no second particles 22 were added. In other words, it is proved that the memory performance is improved by adding particles having different charge characteristics from the first particles 21 (second particles 22). However, in the experimental example 6, the memory performance was hardly observed. Two reasons are assumed for this. As a first reason, it is thought that because of reduced particle size of silica gel acting as the second particles 22, an electrical image force exerted by the second particles 22 was made smaller than that exerted by the first particles 21, which made it difficult to balance charges. As a second reason, it is thought that a volume large enough to suppress diffusion of the first particles 21 after removal of an applied voltage was unable to be assured.

Further, in the experimental example 2, improvement of the memory performance was observed, although the holding time thereof was not sufficient. It is thought that this is because the additive amount of the second particles 22 was small. In the experimental examples 3 to 5, the excellent memory performance was observed. However, in the experimental example 3, the memory performance was improved, and the excellent contrast was maintained, although in the experimental examples 4 and 5, the reflectivity and contrast were deteriorated. It is thought that this is because the additive amount of the second particles 22 was excessive in the experimental example 4. In the experimental example 5, it is thought that because of increased particle size for each of the second particles 22, a space where the second particles 22 are capable of migrating is reduced, causing easiness of migration to degrade. Further, in the experimental examples 1 to 6, silica gel was used as the second particles 22, although, as seen from a result of the experimental example 7, a material is not limited to the silica gel, but it is proved that the same result is achievable even if any other material (titanium oxide in this case) is used. It is to be noted that because the titanium oxide is white, and the reflection characteristics thereof is higher than those of the silica gel, the white reflectivity was improved as compared with the experimental examples 1 to 6.

The present technology is described with reference to one embodiment thus far, although the present technology is not limited to the above-described embodiment, but different variations are available. For example, the electrophoresis device according to the above-described embodiment of the present disclosure is not limited to the display, but may be applicable to any other electronic apparatuses.

Furthermore, the technology encompasses any possible combination of some or all of the various embodiments described herein and incorporated herein.

It is possible to achieve at least the following configurations from the above-described example embodiments of the disclosure.

(1) An electrophoresis device, including:
a plurality of electrophoretic particles included in insulating liquid and configured of a first particle and a second particle, the first particle and the second particle having respective charging characteristics that are different from each other; and
a porous layer included in the insulating liquid and formed of a fibrous structure.
(2) The electrophoresis device according to (1), wherein an abundance ratio of the first particle to the second particle is at least about 1:0.5 but no more than about 1:30.
(3) The electrophoresis device according to (1) or (2), wherein the second particle has a particle size that is equal to or less than a particle size of the first particle.
(4) The electrophoresis device according to any one of (1) to (3), wherein the second particle has a particle size that is at least about 50 nm but no more than about 200 nm.
(5) The electrophoresis device according to any one of (1) to (4), wherein the first particle and the second particle have respective charging characteristics that are opposite to each other.
(6) The electrophoresis device according to any one of (1) to (5), wherein the first particle and the second particle have respective reflection characteristics that are different from each other.
(7) The electrophoresis device according to any one of (1) to (6), wherein the first particle or the second particle has a reflection characteristic that is equivalent to a reflection characteristic of the insulating liquid.
(8) The electrophoresis device according to any one of (1) to (7), wherein the first particle or the second particle has a reflection characteristic that is equivalent to a reflection characteristic of the fibrous structure.
(9) The electrophoresis device according to any one of (1) to (8), wherein a difference in refractive index between the first particle or the second particle and the insulating liquid is at least about 0 but no more than about 2.1.
(10) The electrophoresis device according to any one of (1) to (9), wherein the fibrous structure includes a plurality of non-electrophoretic particles each having a reflection characteristic that is different from a reflection characteristic of the first particle or a reflection characteristic of the second particle.
(11) The electrophoresis device according to any one of (1) to (10), wherein the fibrous structure is configured of one of a polymeric material and an inorganic material.
(12) The electrophoresis device according to any one of (1) to (11), wherein the fibrous structure has an average fiber diameter that is at least about 0.1 μm but no more than about 10 μm.
(13) The electrophoresis device according to any one of (1) to (12), wherein the fibrous structure is formed by an electrostatic fiber spinning method.
(14) The electrophoresis device according to any one of (1) to (13), wherein the fibrous structure is a nanofiber.
(15) The electrophoresis device according to any one of (10) to (14), wherein the electrophoretic particles and the non-electrophoretic particles are each configured of a material selected from a group consisting of an organic pigment, an inorganic pigment, a dye, a carbon material, a metallic material, a metal oxide, a glass, and a polymeric material.

(16) The electrophoresis device according to any one of (10) to (15), wherein the non-electrophoretic particles each have a reflectivity that is higher than a reflectivity of each of the electrophoretic particles.

(17) A display provided with a pair of base materials one or both of which has an optical transparency and each of which is provided with an electrode, and an electrophoresis device disposed between the pair of base materials, the electrophoresis device including:

a plurality of electrophoretic particles included in insulating liquid and configured of a first particle and a second particle, the first particle and the second particle having respective charging characteristics that are different from each other; and a porous layer included in the insulating liquid and formed of a fibrous structure.

The present disclosure contains subject matter related to that disclosed in Japanese Priority Patent Application JP 2012-147643 filed in the Japan Patent Office on Jun. 29, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electrophoresis device, comprising:
a plurality of electrophoretic particles included in insulating liquid and including a first particle and a second particle, the first particle and the second particle having respective charging and reflection characteristics that are different from each other; and
a porous layer included in the insulating liquid and formed of a fibrous structure,
wherein the porous layer includes a plurality of non-electrophoretic particles, and
wherein the porous layer has a polarity same as the first particle.

2. The electrophoresis device according to claim 1, wherein average particle size of the second particle is less than the first particle.

3. The electrophoresis device according to claim 1, wherein the second particle has a particle size that is at least about 50 nm but no more than about 200 nm.

4. The electrophoresis device according to claim 1, wherein the first particle and the second particle have respective charging characteristics that are opposite to each other.

5. The electrophoresis device according to claim 1, wherein the first particle or the second particle has a reflection characteristic that is equivalent to a reflection characteristic of the insulating liquid.

6. The electrophoresis device according to claim 1, wherein the first particle or the second particle has a reflection characteristic that is equivalent to a reflection characteristic of the fibrous structure.

7. The electrophoresis device according to claim 1, wherein a difference in refractive index between the first particle or the second particle and the insulating liquid is at least about 0 but no more than about 2.1.

8. The electrophoresis device according to claim 1, wherein the fibrous structure includes the plurality of non-electrophoretic particles, and if the first particle is configured to perform a bright display, at least one of the plurality of non-electrophoretic particles is configured to perform a dark display, and if the first particle is configured to perform a dark display, at least one of the plurality of non-electrophoretic particles is configured to perform a bright display such that the contrast is generated based on a difference in reflection characteristics between the first particle and the at least one of the plurality of non-electrophoretic particles.

9. The electrophoresis device according to claim 1, wherein the fibrous structure is configured of one of a polymeric material and an inorganic material.

10. The electrophoresis device according to claim 1, wherein the fibrous structure has an average fiber diameter that is at least about 0.1 µm but no more than about 10 µm.

11. The electrophoresis device according to claim 1, wherein the fibrous structure is formed by an electrostatic fiber spinning method.

12. The electrophoresis device according to claim 1, wherein the fibrous structure is a nanofiber.

13. The electrophoresis device according to claim 1, wherein the electrophoretic particles and the non-electrophoretic particles are each configured of a material selected from a group consisting of an organic pigment, an inorganic pigment, a dye, a carbon material, a metallic material, a metal oxide, a glass, and a polymeric material.

14. The electrophoresis device according to claim 1, wherein the non-electrophoretic particles each have a reflectivity that is higher than a reflectivity of each of the electrophoretic particles.

15. The electrophoresis device according to claim 1, wherein the fibrous structure comprises at least one non-electrophoretic particle, and at least a part of the at least one non-electrophoretic particle is buried into the fibrous structure.

16. The electrophoresis device according to claim 1, wherein the abundance ratio of the first particle to the second particle is at least about 1:10.

17. The electrophoresis device according to claim 16, wherein the abundance ratio of the first particle to the second particle is no more than about 1:15.

18. The electrophoresis device according to claim 1, wherein the abundance ratio of the first particle to the second particle is no more than about 1:15.

19. The electrophoresis device according to claim 1, wherein the porous layer included in the insulating liquid is a three-dimensional solid structure formed of the fibrous structure.

20. The electrophoresis device according to claim 1, wherein the second particle has a smaller particle size than that of the first particle.

21. The electrophoresis device according to claim 1, wherein an abundance ratio of the first particle to the second particle is greater than 1:2 and less than about 1:30.

22. The electrophoresis display device according to claim 1, wherein a reflection characteristic of the porous layer is such that the porous layer optically shields the first and second particle.

23. The electrophoresis display device according to claim 1, wherein the first particle has a color that is approximately black, and the porous layer has a color that is approximately white.

24. The electrophoresis display device according to claim 1, wherein the first particle has a color that is approximately white, and the porous layer has a color that is approximately black.

25. The electrophoresis display device according to claim 1, wherein the second particle is transparent.

26. An electrophoresis device, comprising:
a plurality of electrophoretic particles included in insulating liquid and configured of a first particle and a second particle, the first particle and the second particle having respective charging characteristics that are different from each other; and
a porous layer included in the insulating liquid and formed of a fibrous structure,
wherein the fibrous structure includes a plurality of non-electrophoretic particles, and
wherein the porous layer has a polarity same as the first particle.

27. The electrophoresis display device according to claim 26, wherein average particle size of the second particle is less than the first particle.

28. The electrophoresis display device according to claim 26, wherein the second particle is transparent.

* * * * *